United States Patent
Glass, III et al.

(10) Patent No.: US 12,038,242 B2
(45) Date of Patent: Jul. 16, 2024

(54) HEAT EXCHANGER ASSEMBLIES HAVING EMBEDDED SENSORS

(71) Applicant: BATTELLE MEMORIAL INSTITUTE, Richland, WA (US)

(72) Inventors: Samuel W. Glass, III, Richland, WA (US); Morris S. Good, Pasco, WA (US); Matthew S. Prowant, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 256 days.

(21) Appl. No.: 16/895,661

(22) Filed: Jun. 8, 2020

(65) Prior Publication Data

US 2020/0388410 A1 Dec. 10, 2020

Related U.S. Application Data

(60) Provisional application No. 62/858,527, filed on Jun. 7, 2019.

(51) Int. Cl.
*F28F 27/00* (2006.01)
*G01N 29/04* (2006.01)
(Continued)

(52) U.S. Cl.
CPC ........... *F28F 27/00* (2013.01); *G01N 29/041* (2013.01); *G01N 29/07* (2013.01); *G01N 29/223* (2013.01);
(Continued)

(58) Field of Classification Search
CPC ..... F28F 27/00; F28F 2265/16; F22B 37/003; G21C 17/017; G01N 29/041; G01N 29/07; G01N 29/223
(Continued)

(56) References Cited

U.S. PATENT DOCUMENTS

| | | | | |
|---|---|---|---|---|
| 4,337,431 A | * | 6/1982 | Hale | G01N 27/904 324/238 |
| 4,438,805 A | * | 3/1984 | Gugel | F22B 37/005 165/11.2 |

(Continued)

OTHER PUBLICATIONS

Anheier et al., "Technical Readiness and Gaps Analysis of Commercial Optical Materials and Measurement Systems for Advanced Small Modular Reactors", PNNL-22622, Rev. 1, SMR/ICHMI/PNNL/TR-2013/04, Aug. 2013, United States, 285 pages.

(Continued)

*Primary Examiner* — Raheena R Malik
(74) *Attorney, Agent, or Firm* — Wells St. John P.S.

(57) ABSTRACT

Heat exchanger assemblies are provided that can include: a heat exchanger housing; at least one primary conduit operably coupled to the heat exchanger housing and configured to convey a primary heat exchange fluid; at least one secondary conduit operably coupled to the heat exchanger housing and configured to convey a secondary heat exchange fluid; at least one thermal interface between the primary and secondary fluids; and at least one sensor operably engaged with the thermal interface. Heat exchanger assemblies including molten salt, liquid metal, or water/steam as part of the heat exchange fluids of the heat exchanger assembly are provided. The heat exchanger assemblies can include: at least one thermal interface between primary and secondary heat exchange fluids of the heat exchanger assembly; and a sensor operably engaged with the at least one interface.

11 Claims, 11 Drawing Sheets

(51) Int. Cl.
  G01N 29/07    (2006.01)
  G01N 29/22    (2006.01)
  G01N 29/24    (2006.01)
  G21C 17/022   (2006.01)
(52) U.S. Cl.
  CPC ...... *G01N 29/2475* (2013.01); *F28F 2265/16* (2013.01); *G21C 17/022* (2013.01)
(58) Field of Classification Search
  USPC ..................................................... 324/222
  See application file for complete search history.

(56) References Cited

U.S. PATENT DOCUMENTS

| | | | | |
|---|---|---|---|---|
| 4,649,989 | A * | 3/1987 | Vermaat | F22B 37/003 279/2.03 |
| 4,804,291 | A * | 2/1989 | Everett | F22B 37/005 403/287 |
| 4,984,627 | A * | 1/1991 | LeBourgeois | F22B 37/006 165/11.2 |
| 5,025,854 | A * | 6/1991 | Richter | F22B 37/003 901/44 |
| 5,105,876 | A * | 4/1992 | Burack | F22B 37/003 901/44 |
| 5,178,822 | A * | 1/1993 | Buford, III | F22B 37/483 122/504 |
| 5,247,251 | A * | 9/1993 | Yost | F22B 37/003 376/245 |
| 5,611,948 | A * | 3/1997 | Hawkins | F22B 37/003 376/245 |
| 6,425,998 | B1 * | 7/2002 | Cholewa | C10G 35/00 585/407 |
| 7,234,347 | B2 * | 6/2007 | Harthorn | G03B 42/06 73/865.8 |
| 9,127,896 | B1 * | 9/2015 | Nehlen, III | B01D 29/012 |
| 2010/0071470 | A1 * | 3/2010 | Junker | G01N 29/348 73/623 |
| 2012/0193065 | A1 * | 8/2012 | Kawase | G01N 27/902 165/11.1 |
| 2014/0331771 | A1 * | 11/2014 | Baba | G01B 21/085 73/597 |
| 2018/0179960 | A1 * | 6/2018 | Apte | H02P 9/04 |

OTHER PUBLICATIONS

Arkani et al., "Reactor Core Power Measurement Using Cherenkov Radiation and Its Application in Tehran Research Reactor", Annals of Nuclear Energy 36, 2009, United Kingdom, pp. 896-900.

Bakhri et al., "Preliminary Development of Online Monitoring Acoustic Emission System for the Integrity of Research Reactor Components", Int'l Conference on Nuclear Technologies and Sciences, available online at https://iopscience.iop.org/article/10.1088/1742-6596/962/1/012064/pdf, 2018, 10 pages.

Chen et al., "Regenerated Gratings in Air-Hole Microstructured Fibers for High-Temperature Pressure Sensing", Optics Letters vol. 36, No. 18, Sep. 2011, United States, pp. 3542-3544.

Eddyfi Technologies, "Teletest FOCUS+ Guided Wave Pipeline Inspection", available online at https://www.teletestndt.com/focus-guided-wave-inspection/, May 31, 2019, 4 pages.

EIRP, "What Will Advanced Nuclear Power Plants Cost? A Standardized Cost Analysis of Advanced Nuclear Technologies in Commercial Development", Energy Innovation Reform Project, 2018, United States, 47 pages.

EPRI, "Program on Technology Innovation: Technology Assessment of a Molten Salt Reactor Design—The Liquid-Fluoride Thorium Reactor (LFTR)", Electric Power Research Institute Technical Report, Oct. 2015, United States, 198 pages.

Forsberg, "Molten-Salt-Reactor Technology Gaps", International Congress on the Advances in Nuclear Power Plants (ICAPP), Jun. 2006, United States, 7 pages.

GIF, "Gen IV International Forum Annual Report", available online at https://www.gen-4.org/gif/upload/docs/application/pdf/2013-10/gif_2011_annual_report.pdf, 2011, 97 pages.

Glass et al., "Magnetostrictive Cold Spray Sensor for Long Term or Harsh Environment Ultrasound", PNNL-SA-142243, Proceedings of ASNT Research Symposium, Garden Grove, CA, Apr. 2, 2019, United States, 7 pages.

Idaho National Laboratory, "Digital Environment for Advanced Reactors Workshop" Report INL/EXT-18-46051, Argonne National Laboratory, Chicago, IL, Jun. 5-6, 2018, 35 pages.

Jewart et al., "Ultrafast Femtosecond-Laser-Induced Fiber Bragg Gratings in Air-Hole Microstructured Fibers for High-Temperature Pressure Sensing", Optics Letters vol. 35, No. 9, 2010, United States, pp. 1443-1445.

Kloosterman, "Nuclear Reactors: Fission Process", Delft University of Technology, The Netherlands, available online at http://www.janleenkloosterman.nl/reactors.php, May 4, 2019, 5 pages.

Lowe et al., "Long Range Guided Wave Inspection Usage-Current Commercial Capabilities and Research Directions", Imperial College United Kingdom, available online at http://www3.imperial.ac.uk/pls/portallive/docs/1/55745699.PDF, Mar. 29, 2006 (accessed Oct. 19, 2018), 40 pages.

Prowant et al., "Preliminary Design of High Temperature Ultrasonic Transducers for Liquid Sodium Environments", AIP 44th Annual Review of Progress in Quantitative Nondestructive Examination vol. 37, 2018, United States, 8 pages.

SwRI, "Magnetostrictive Sensor-Based Guided Waves", available online at https://www.swri.org/magnetostrictive-sensor-based-guided-waves, 2017, 2 pages.

Upadhyaya et al., "On-Line Monitoring and Diagnostics of the Integrity of Nuclear Plant Steam Generators and Heat Exchangers", available online at https://www.osti.gov/servlets/purl/832717, Sep. 2004, 160 Pages.

Wright et al., "Status of Metallic Structural Materials for Molten Salt Reactors", Idaho National Laboratory INL/EXT-18-45171, available online at https://art.inl.gov/ART%20Document%20Library/High%20Temperature%20Materials/45171% 20Status%20of% 20Metallic%20Structural.pdf, 2018, 34 pages.

Collins et al., "Cerenkov Radiation", Physical Review 54, Oct. 1938, United States, pp. 499-505.

Davies et al., "The Application of Synthetic Focusing for Imaging Crack-Like Defects in Pipelines using Guided Waves", IEEE Transactions on Ultrasonics, Ferroelectrics, and Frequency Control vol. 56, Issue 4, Apr. 2009, United States, pp. 759-770.

Glass et al., "Feasibility of Molten Salt Reactor Heat Exchanger Online Monitoring", Journal of Nondestructive Evaluation, Diagnostics and Prognostics of Engineering Systems, Nov. 2021, United States, 4 pages.

Glass et al., "Progress Toward Molten Salt Reactor Heat Exchanger On-Line Monitoring", Transactions of the American Nuclear Society vol. 122, Jun. 2020, United States, pp. 155-157.

Higgs et al., "Ultrasonic Absorption and Velocity in Molten Salts", The Journal of the Acoustical Society of America 32, 1960, United States, pp. 1108-1115.

Liu et al., "Infrared Thermography Measurement of Two-Phase Boiling Flow Heat Transfer in a Microchannel", Applied Thermal Engineering vol. 94, Feb. 2016, United Kingdom, pp. 568-578.

Mohimi et al., "Development of High Temperature Ultrasonic Guided Wave Transducer for Continuous in Service Monitoring of Steam Lines Using Non-Stoichiometric Lithium Niobate Piezoelectric Ceramic", Sensors and Actuators A: Physical vol. 216, Sep. 2014, Netherlands, pp. 432-442.

Rippon, "Cherenkov Detectors for the Measurement of Reactor Power", Nuclear Instruments and Methods vol. 21, 1963, Netherlands, pp. 192-196.

Vinogradov et al., "Magnetostrictive Sensing Probes for Guided Wave Testing of High Temperature Pipes", Materials Evaluation vol. 72(6), Jun. 2014, United States, pp. 803-811.

Von Barner et al., "Vibrational Spectra of Fluoro and Oxofluoro Complexes of Nb(V) and Ta(V)", International Symposium on Molten Salt Chemistry and Technology, Materials Science Forum, Jul. 15-19, 1991, France, pp. 279-283.

(56) References Cited

OTHER PUBLICATIONS

Voyiatzis et al., "Raman Spectra of Subvalent Mercury Species Formed During Electrolysis of HgCl2 in Melts", International Symposium on Molten Salt Chemistry and Technology, Materials Science Forum, Jul. 15-19, 1991, France, pp. 285-289.

Whiting et al., "Spectral Evidence for the Existence of the Superoxide Ion in Molten LiF-NaF-KF", Journal of the American Chemical Society 91(23), 1969, United States, pp. 6531-6532.

Young et al., "Absorption Spectra of Molten Fluoride Salts. Solutions of Praseodymium, Neodymium, and Samarium Fluoride in Molten Lithium Fluoride", Analytical Chemistry 32, Nov. 1960, United States, pp. 1658-1661.

Young et al., "Absorption Spectra of Molten Fluoride Salts. Solutions of Several Metal Ions in Molten Lithium Fluoride-Sodium Fluoride-Potassium Fluoride", Analytical Chemistry 32, Jun. 1960, United States, pp. 799-802.

Young et al., "Coordination of Fluoride Ions About Nickel (II) Ions in the Molten LiF-NaF-KF Eutectic", The Journal of Chemical Physics 40(3), 1964, United States, pp. 913-914.

Young et al., "High-Temperature Cell Assembly for Spectrophotometric Studies of Molten Fluoride Salts", Analytical Chemistry 31, Nov. 1959, United States, pp. 1892-1895.

Young et al., "Simultaneous Voltammetric Generation of U(III) and Spectrophotometric Observation of the U(III)-U(IV) System in Molten Lithium Fluoride-Beryllium Fluoride-Zirconium Fluoride", The Journal of Physical Chemistry 71(2), Feb. 1967, United States, pp. 782-783.

Young et al., "Spectral Studies of f-d and f-f Transitions of Pa(IV) in Molten LiF-BeF2-ThF4", Journal of Inorganic and Nuclear Chemistry vol. 36, Issue 11, Nov. 1974, Netherlands, pp. 2630-2632.

Young, "Spectra of Uranium(IV) and Uranium(III) in Molten Fluoride Solvents", Inorganic Chemistry 6(8), Aug. 1967, United States, pp. 1486-1488.

\* cited by examiner

HEAT EXCHANGER ASSEMBLIES HAVING EMBEDDED SENSORS

CROSS REFERENCE TO RELATED APPLICATION

This application claims priority to and the benefit of U.S. Provisional Patent Application Ser. No. 62/858,527 filed Jun. 7, 2019, entitled "Online Heat Exchanger Tube Guided Wave Sensor", the entirety of which is incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

TECHNICAL FIELD

The present disclosure related to heat exchanger assemblies and methods. In particular configurations, the present disclosure provides heat exchanger assemblies and methods for use with fission reactors such as light water pressurized reactors (PWRs), molten salt reactors (MSRs) and liquid metal reactors (LMRs).

BACKGROUND

Typical heat exchanger assemblies have at least two heat transfer fluids. These fluids are sometimes referred to as primary and secondary fluids of the heat exchanger assembly. Primary heat exchange fluids can enter the heat exchange assembly at a higher temperature than when the fluid exits the heat exchange assembly, and secondary heat exchange fluids can enter the heat exchange assembly at a lower temperature than when the fluid exits the heat exchange assembly. The heat exchange fluids can be provided within representative primary and secondary conduits.

Between these fluids is a thermal interface. This interface can be a wall or plate, multiple walls, or the wall can be part of a cylinder such as tubing or a conduit, for example. Regrettably, during operation of the assembly, the heat transfer fluids themselves, the heat transfer process, or a combination of the heat and fluid interaction, can lead to the breakdown of the integrity of these interfaces which can lead to the breakdown of the system or assembly of which the heat exchanger assembly is a component. In order to ensure the system operates consistently and reliably, the heat exchanger assembly, and particularly, the thermal interface can be inspected after one or both of the heat transfer fluids are removed from the assembly. Understandably, this requires shutting the system down for inspection, which can be costly or impractical. The present disclosure provides heat exchanger assemblies and methods that can be used to determine thermal interface integrity without removing either or both of the heat transfer fluids.

Additional advantages and novel features of the present disclosure will be set forth as follows and will be readily apparent from the descriptions and demonstrations set forth herein. Accordingly, the following descriptions of the present disclosure should be seen as illustrative of the disclosure and not as limiting in any way.

SUMMARY

Heat exchanger assemblies are provided that can include: a heat exchanger housing; at least one primary conduit operably coupled to the heat exchanger housing and configured to convey a primary heat exchange fluid; at least one secondary conduit operably coupled to the heat exchanger housing and configured to convey a secondary heat exchange fluid; at least one thermal interface between the primary and secondary fluids; and at least one sensor operably engaged with the thermal interface.

Heat exchanger assemblies including molten salt, liquid metal, or water/steam as part of the heat exchange fluids of the heat exchanger assembly are provided. The heat exchanger assemblies can include: at least one thermal interface between primary and secondary heat exchange fluids of the heat exchanger assembly; and a sensor operably engaged with at least one interface.

Methods for determining the structural integrity of a thermal interface within a heat exchanger assembly are provided. The methods can include, while at least one or both of the primary or secondary conduits contain heat exchange fluid, sensing structural integrity information of the thermal interface between the heat exchange fluids using one or more sensors engaged with the thermal interface.

In accordance with additional embodiments, heat exchanger assemblies are provided that can include: a heat exchanger housing; a hot leg conduit operably coupled to the heat exchanger housing, the hot leg plenum, and the hot leg entrance to the thermal interface volume; a cold leg conduit operably coupled to the heat exchanger housing, the cold leg plenum, and the cold leg exit from the thermal interface volume; at least one thermal interface between the hot and cold leg conduits; and a sensor operably engaged with the interface. The secondary fluid on the other side of the thermal interface also has an inlet and outlet. For heating heat exchangers, the secondary fluid enters cooler than the exit temperature. For cooling heat exchangers or condensers, the secondary fluid enters hotter than it exits. Heat exchangers can operate either as heating or cooling components and can function with the primary fluid flowing through the inside of a tubular thermal interface or on the outside of the tubular thermal interface but always with the secondary fluid on the opposite side of the thermal interface. The assemblies and/or methods of the present disclosure can be utilized with heating or cooling heat exchangers, but particular embodiments of the disclosure can be configured as a heating heat exchanger with primary fluid proceeding through the inside of a tubular thermal interface.

Heat exchanger assemblies including liquid metal, molten salt, water, or water/steam fluid as part of the primary or secondary fluid of the heat exchanger assembly are provided. The assemblies can include: at least one thermal interface between the primary and secondary fluids of the heat exchanger assembly; and a sensor is operably engaged with the thermal interface.

Methods for determining the structural integrity of a thermal interface within a heat exchanger assembly are also provided. The methods include; a sensor attached to the thermal interface—either near the hot or cold leg access plenum on the outside diameter (OD) of a tubular thermal interface; a heat exchanger housing; and a conduit and wire assembly to connect a signal from the sensor to an external multiplexer and measurement instrument.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
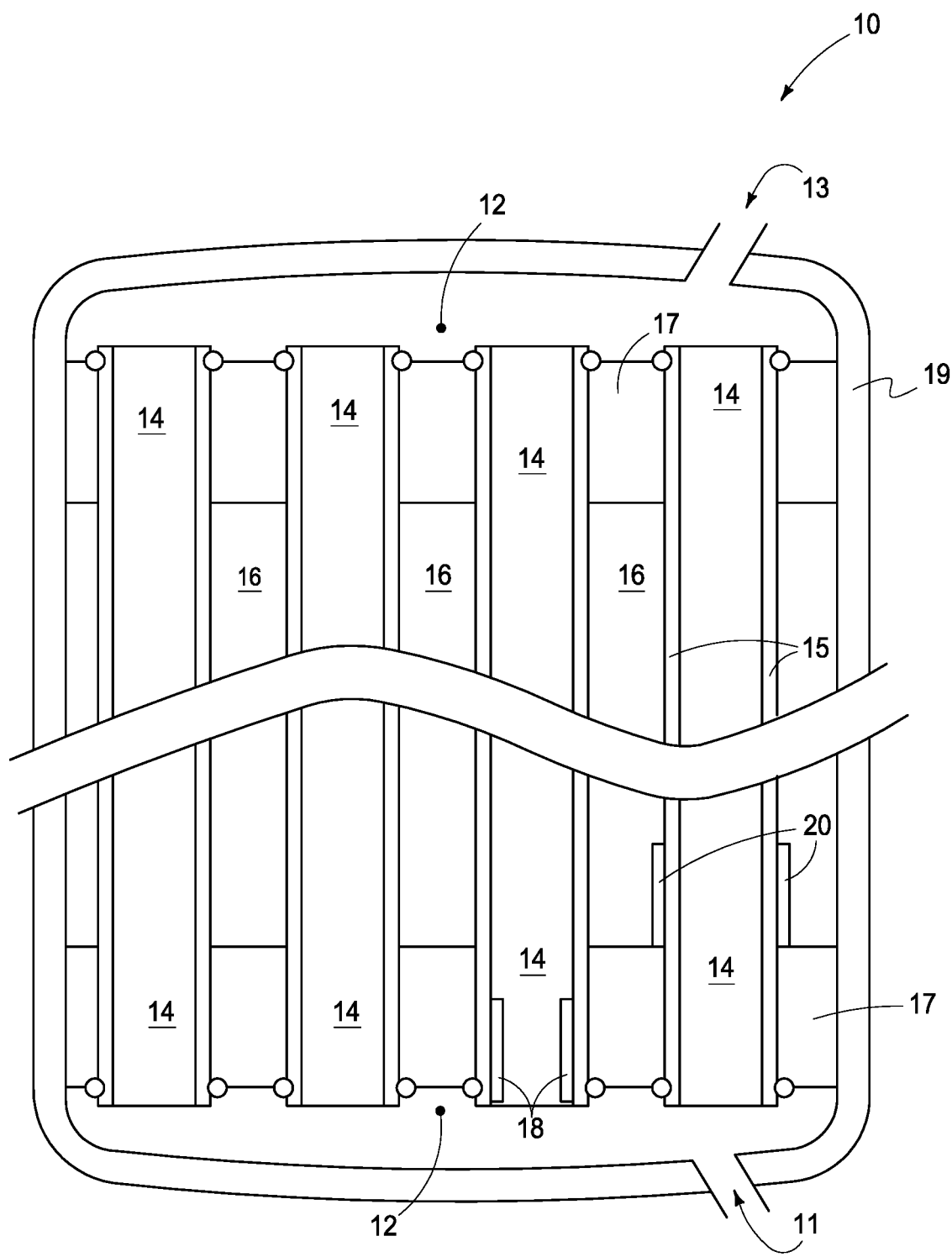
FIG. 1 is a heat exchanger assembly according to an embodiment of the disclosure.

The present disclosure will be described with reference to FIGS. 1-10. Referring first to FIG. 1, an example heat exchanger assembly 10 is shown that includes a pair of access plenums 12 operatively configured as hot (11) and cold (13) leg access plenums, 11 and 13 having primary conduits extending therebetween configured to convey primary transfer fluids 14. The access plenums can be connected by thermal exchange interfaces 15 and be operably associated with secondary heat exchange fluid 16 which can proceed via a secondary conduit defined by secondary tube sheet 17. In accordance with example implementations, the heat exchanger 10 can include sensors 18 and/or sensors 20.

Assembly 10 can be considered a shell and tube heat exchanger assembly having a cylindrical shell 19 with a 2 to 20 cm thick flat tube-sheet 17 on either end of the cylinder. Plenums 12 can be formed at the ends of the cylinder by the hemispherical shell-ends. These ends can be half-sphere caps containing one or more nozzles that allow fluid to be introduced or extracted from the end plenums and designated as the inlet or outlet plenums with inlet or outlet nozzle depending on whether fluid is entering or exiting the heat exchanger. Plenums 12 can be joined by hundreds to thousands of tubes (having thermal interfaces 15 and typically 1 to 3 cm diameter with 1 to 2 mm wall thickness) that are seal-welded to the tube-sheets 17.

Plenums 12 and the tube inside volumes can be connected as a single volume that can be filled with hotter primary fluid. The shell volume between the two tube sheets and on the outside of the tubes may be filled with cooler secondary fluid. This allows heat to flow across the tube wall without the two fluids mixing. Heat exchanger assemblies can also be provided with a single divided domed cylinder where the tubes are formed in an upside-down U-shape extending from the inlet quarter-sphere plenum to the outlet quarter-sphere plenum. This configuration can be designated as a U-Bend heat exchanger.

The heat transfer fluids for which the assemblies and/or methods of the present disclosure are applicable are those that typically do not allow for simple removal and inspection of the thermal interfaces. In particular light water nuclear fission reactor heat exchangers, the hot leg temperatures are nominally 320° C.-370° C. with cold leg temperatures ~50° C. less. For molten salt and other advanced reactors, hot leg temperatures can be >350° C. and more typically >500° C. with cold leg temperatures ~50° C. less. In most advanced reactor implementations, interrupting operation and removal of one or both of the fluids can be impossible and/or impractical.

Figure 2:
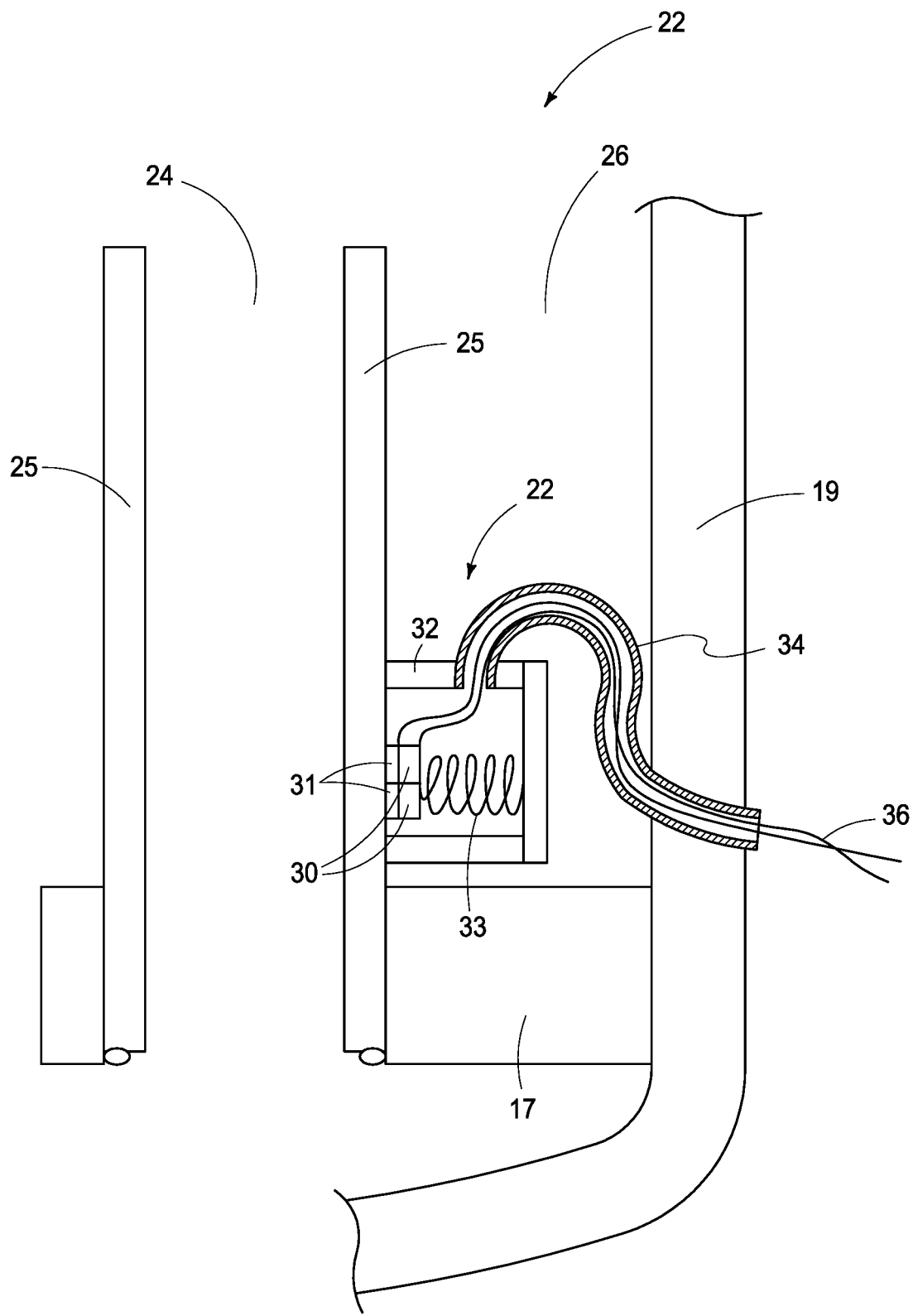
FIG. 2 is a portion of a heat exchanger assembly according to an embodiment of the disclosure.

Referring next to FIG. 2, a heat exchanger assembly 22 is shown in more detail. In accordance with an example implementation, heat exchanger assembly 22 includes sensor array 30 within sensor housing 32 operably coupled to the conduit shell penetration (sensor conduit) 34. Within the sensor conduit shell penetration 34 can be wiring 36 operably connected to the measurement instrument (not shown in this figure). In accordance with example configurations, primary fluid 24 can be operably associated with conduit 26 via thermal interface 25. Coupling between the sensor can be via an adhesive (up to ~500° C.), a brazing compound (for >500° C.) 31, or via a pressure fit utilizing spring 33.

Figure 3:
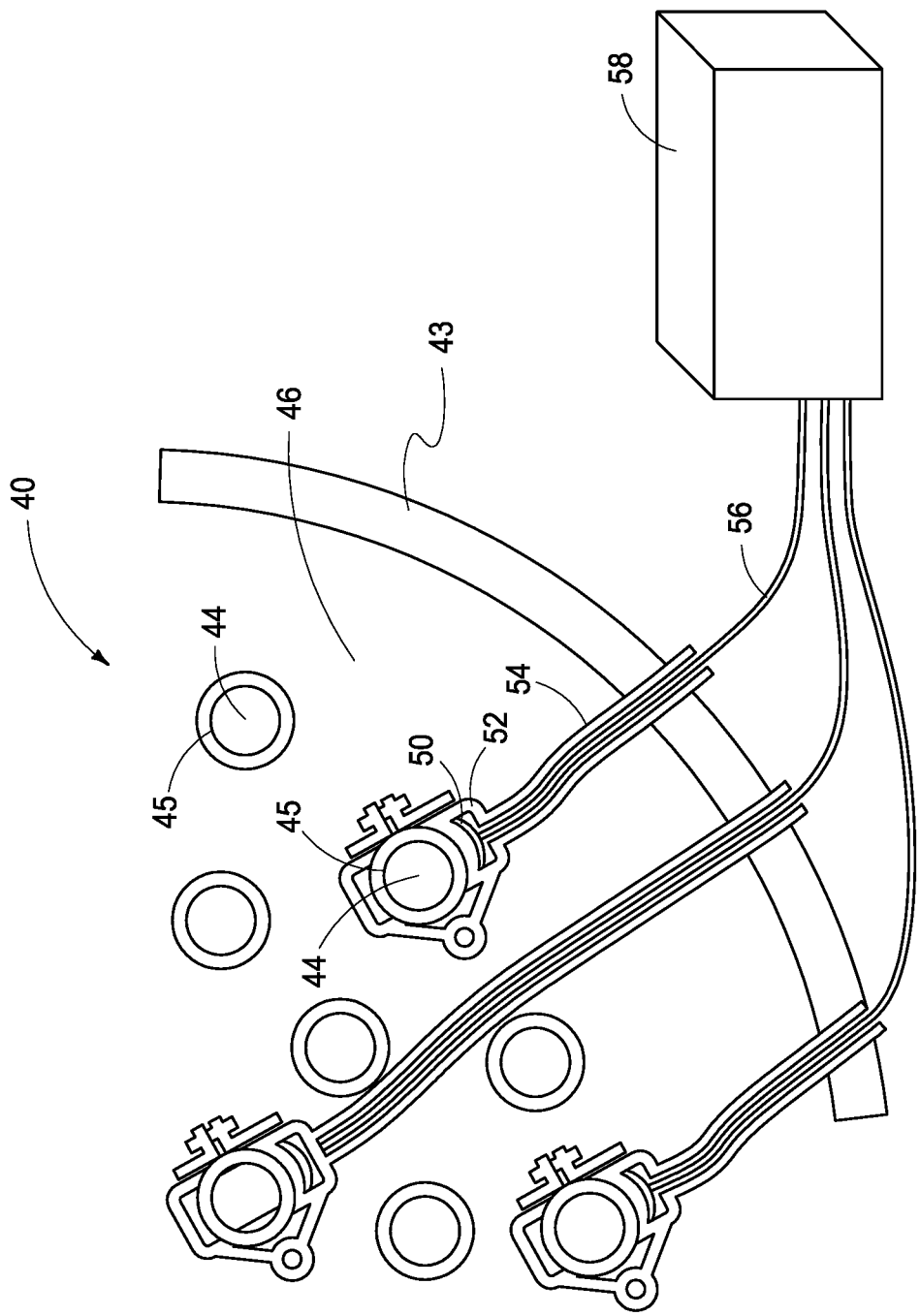
FIG. 3 is a heat exchanger assembly according to an embodiment of the disclosure.

In accordance with another depiction of implementation and with reference to FIG. 3, the heat exchanger assembly 40 is shown having primary fluid conduits 44 with a thermal interface 45. The sensor 50 is operably engaged with the thermal interface 45. The sensor 50 is contained within a housing 52 providing a space in communication with shell penetration conduit 54 that can include a wire 56. This wire 56 can be operably coupled to processing circuitry 58, for example. Processing circuitry 58 can be multiplexing instrumentation.

In accordance with example implementations and with reference to FIGS. 1-3, clamp-on, adhesive, or braze-coupled high temperature piezoelectric sensors mounted near the union of the tube to the tube-sheet are envisioned to generate a Shear Horizontal guided ultrasonic wave that ideally will travel the full length of the tube or at least half way through the tube. If attenuation only allows the signal to travel half-way through the tube, a second sensor may be mounted to the other end of the tube to achieve full coverage of the heat interface. When such an ultrasonic wave reaches the opposite tube end, the signal is reflected back and may be sensed by the same signal generating piezoelectric sensor or a similar receiving piezoelectric sensor. When corrosion or crack anomalies occur in the tube, part of the signal will be reflected and will be detected by the receiving sensor at an earlier point in time than the reflected signal from the tube end. Anomalies originating from the tube ID or OD can be detected before they reach a 100% through-wall breach and ideally before exceeding 50% through wall. For very low temperature heat exchangers, high-piezoelectric coefficient piezoelectric sensor materials like Lead Zirconate Titanate (PZT-5a; Curie Temperature=350° C.) may be used. Piezoelectric sensor materials like lithium niobate ($LiNbO_3$), bismuth titanate ($Bi_4Ti_3O_{12}$), aluminum nitride (AlN), and other materials have a lower piezoelectric coefficient but still perform up to and above 600-800° C. Sensors mounted to the tube OD are subject to high temperatures but typically the lower temperature secondary fluid are on the tube ODs plus the flow forces are minimal in the stagnant area near the intersection of the tube and tube sheet.

The wires can be managed by a protective corrosion resistant structure and routed to and through the heat exchanger shell wall. This management can be characterized as an embedded sensor. Moreover, the sensor can be configured as an embedded sensor because it is installed as the heat exchanger is being fabricated. Spacing between the tubes may allow some periphery tubes to be instrumented after completing the tube/tube-sheet assembly but tubes away from the periphery can be inaccessible after all tubes are installed. Sensor signals can be brought through the tube bundle near the tube sheet or within the tube sheet to a commercial grade qualified cable penetration through the heat-exchanger shell to a multiplexing instrument located away from the heat using high temperature (ceramic or tungsten or other high-temperature insulation) cabling. Other high temperature electronics that may reduce or eliminate conducting penetrations through the shell are also contemplated.

Figure 4:
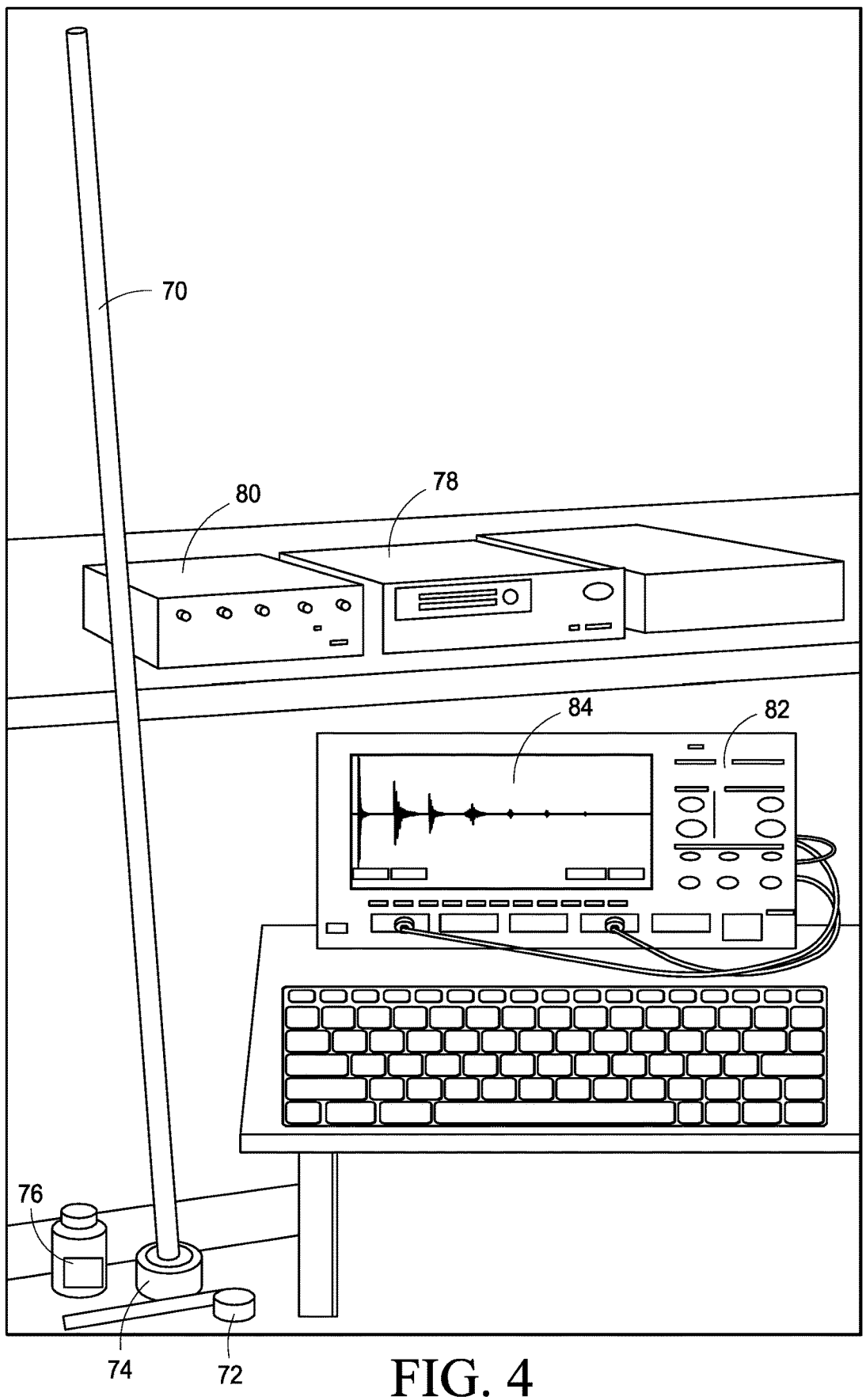
FIG. 4 is processing circuitry utilized in accordance with the present disclosure.

Referring next to FIG. 4, a laboratory configuration of the sensors coupled to the tube and the sensors coupled to the multiplexing equipment is shown. Some of the multiplexing equipment utilized as part of processing circuitry is shown. This multiplexing equipment and processing circuitry can provide readings for determining the integrity (presence or absence of cracks, pits, erosion, corrosion) of the thermal interfaces. Accordingly, the test configuration can include stainless steel, hasteloy, Inconel, or other corrosion-resistant metal tube 70, shear wave transducer 72, lamb wave transducer 74, couplant 76 (in the laboratory, honey; adhesive or brazing material for field installation), square wave for synchronization 78, ultrasonic pulse receiver 80, and digital oscilloscope 82 displaying responses 84.

Figure 5B:
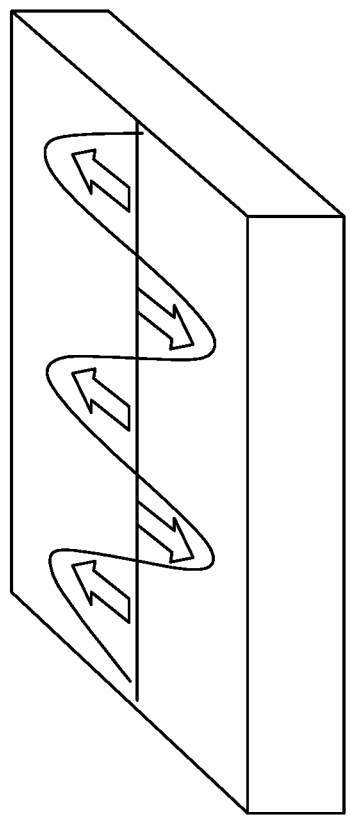
FIGS. 5A-5B are depictions of sensor wave modes of interest.
Figure 5A:
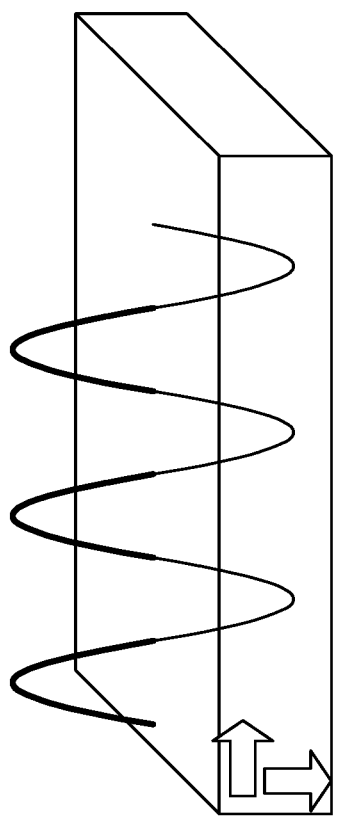

Referring to FIG. 5A-5B, wave modes are shown with 5A representing the L-0 wave and 5B representing the SH-0 Shear-Horizontal wave mode. In accordance with example implementations and with reference to FIG. 5A, the Lamb wave particle motion is perpendicular to the surface, and this motion can be attenuated by fluid. With reference to FIG. 5B, the Shear-Horizontal wave mode particle motion is parallel to the surface, and this motion is not substantially attenuated by surface-contacting fluid. These are some examples of wave modes that may be generated in plates and tubes associated with the heat exchangers. The piezoelectric crystals can be grown and cut differently to produce these different types of motions, and the sensors designed accordingly. In accordance with example implementations, the focus can be on the SH-0 wave mode to avoid influence from surface-contacting fluids.

For SH-0 to be nondispersive in steel, the frequency-thickness product (MHz-mm) may be less than approximately 1.5. Thus, for heat exchanger tubes with a wall thickness of nominally 0.8-1.5 mm, nondispersive frequencies can be <1-1.5 MHz. It has been recognized that higher frequencies can have better spatial resolution, but lower frequencies may be less attenuative.

SH mode transducers can be coupled by a material that can support shear stress. A thin layer of honey can work well for temporary (laboratory) sensors; however, an adhesive or a brazed metallurgical bond, or a high contact pressure between the sensor and the thermal interface is required for permanent (in situ) sensors. Sensor placement can be at tube ends or within the tube after the heat exchanger is fabricated however this region is typically a high flow area that can experience significant forces on both the sensor and wiring during operation, plus the sensor would occlude fluid flow through the tube thereby compromising the heat-exchange function of that tube. Thus, placing the sensor at the tube end or within the tube does not work for an online monitor. When sensors are incorporated during the heat exchange assembly fabrication process, however, the same kinds of SH-0 waves can be generated from a sensor mounted in the stagnant flow area of the tube outer diameter (OD) without compromising the heat-exchange tube function.

Figure 6:
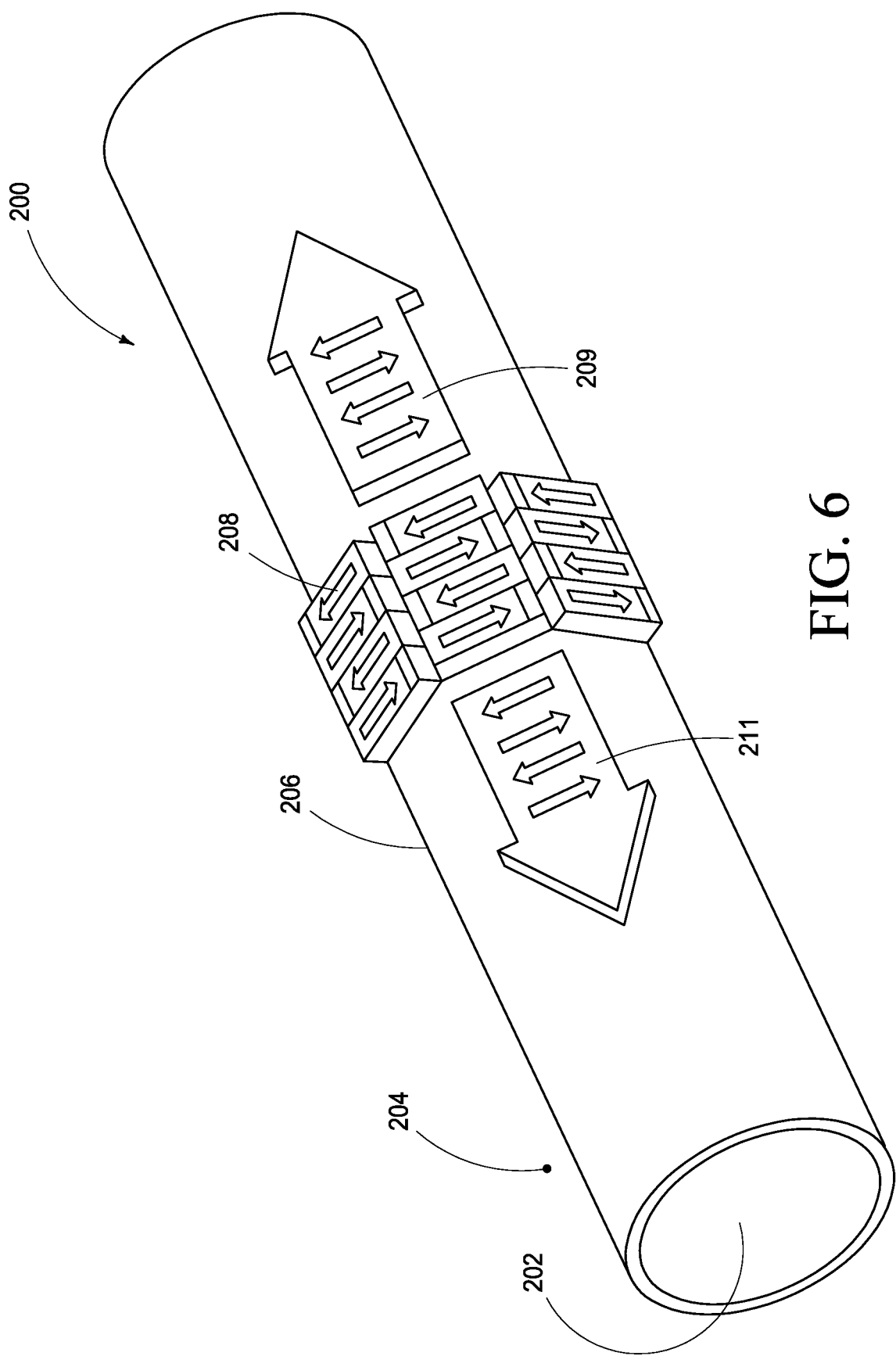
FIG. 6 is a depiction of a portion of a heat exchanger assembly according to an embodiment of the disclosure.

Referring next to FIG. 6, a portion of the heat exchanger assembly 200 is shown that includes primary fluid 202 and secondary fluid 204. In accordance with example implementations, sensor components 208 can be associated with the thermal transfer interface 206. In accordance with one example implementation, this can be a representation of the SH-0 mode piezoelectric sensor array adhered directly to the thermal transfer interface. The elemental direction can be important in order to reinforce the wave generated and as shown, the wave is generated in both directions equally.

In accordance with FIG. 6 sensor configuration, sensors 208 can include four elements side-to-side with alternating polarity, with three elements end-to-end circumferentially of the same polarity. This can propagate a forward wave 209 and a backward wave 211.

Several transducer (sensor) configurations were tested with the preferred configuration (3 circumferential elements×4 axial elements) shown in FIG. 6. This was the preferred configuration noting that acoustic noise was less when three elements were added length-to-length circumferentially to form a 90° circumferential extent. Shear-wave coupling was found to be most effective at the point of contact. Signal strength is likely increased with more smaller circumferential elements. The frequency-thickness product for a 0.5 MHz wave and a 0.89 mm wall thickness was 0.5, which is well below the 1.5 criteria for a nondispersive wave.

Three anomalies representing flaws were placed in a 3.0 m (10 ft.) long 316 stainless steel tube as follows: Tube wall thickness—0.89 mm (0.035 in.); OD—191 mm (0.75 in.); 50% through-wall, 6.4 mm (0.25 in.) diameter flat-bottom hole emulating a pit; Through-wall, 6.4 mm (0.25 in.) diameter hole; 50% through-wall, 90-degree notch emulating a crack.

The sensor was composed primarily of PZT-5A (Curie temperature of 350° C.) shear piezoelectric ceramic material. Each element had dimensions of 3.1 mm width, 1.79 mm thickness height, and 8.0 mm length. Chrome-gold electrodes were used with a chrome denoting the "+" polarity end. Honey was used as the ultrasonic shear-wave couplant between piezoelectric elements and the stainless-steel tube. A conventional digital oscilloscope and ultrasonic pulser-receiver were used to acquire data. A 4×3 array of low temperature (PZT-5a) sensors were installed as described above and demonstrated sensitivity to 50% crack/notch-like and pit-like machined flaws as well as through-wall hole flaws in a 10-ft tube at low temperature.

Figure 7:
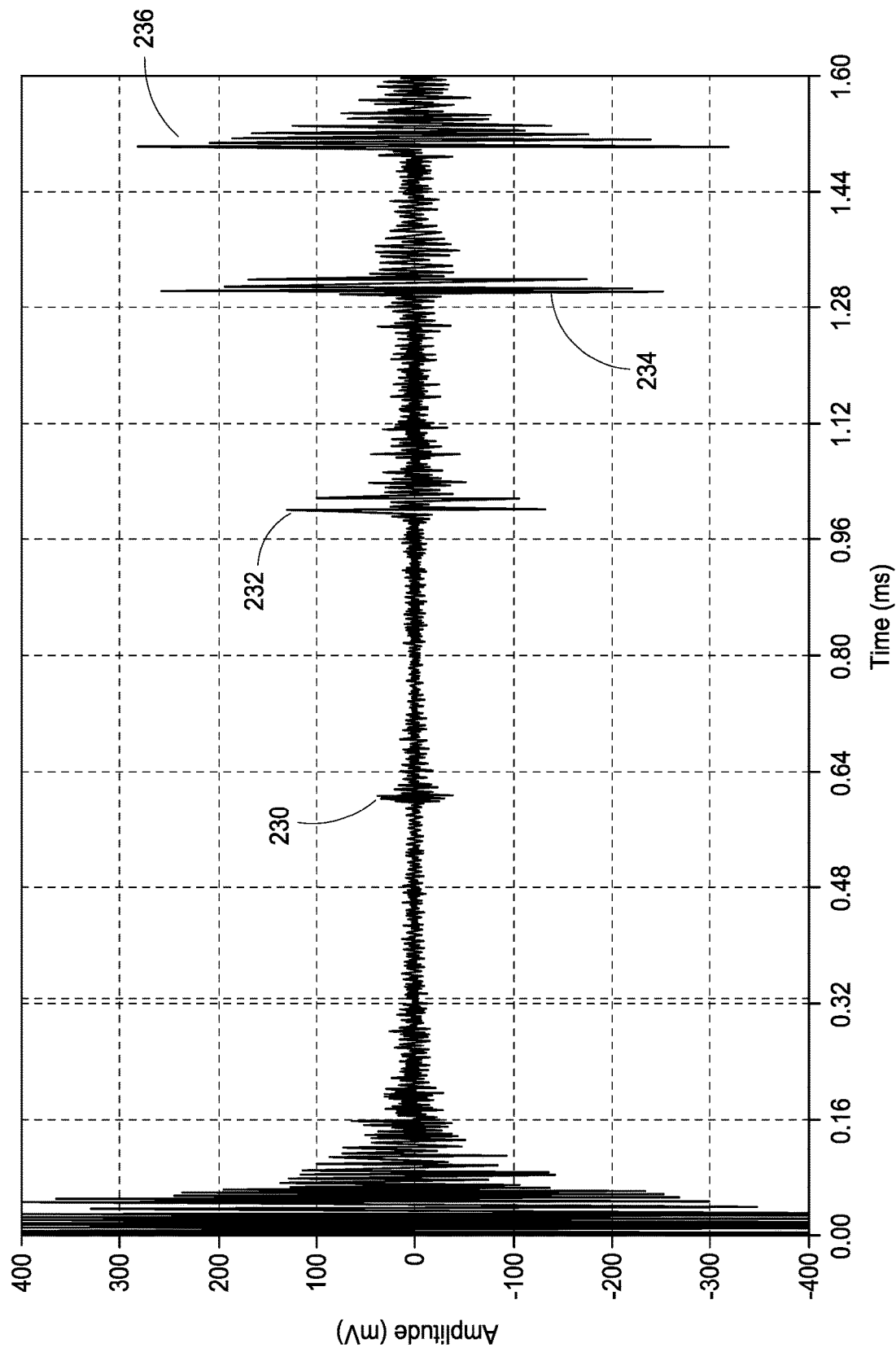
FIG. 7 is example data acquired utilizing the assemblies and/or methods of the present disclosure.

Referring to FIG. 7, in a configuration utilizing a 316 stainless steel seamless tube having a 3.0 m length and outside diameter of 19 mm and a wall thickness of 0.89 mm, a pit, through holes, and a notch was were provided. The pit was 6.4 mm in diameter, flat bottom, and 50% through wall depth. The Through hole was 6.4 mm in diameter, and the notch extended 90° circumferentially and was 50% through wall depth. As shown in FIG. 7, all flaws were clearly detectable; the pit was noted at 230, the hole was noted at 232, the notch was noted at 234, and the tube end was noted at 236.

Figure 8B:
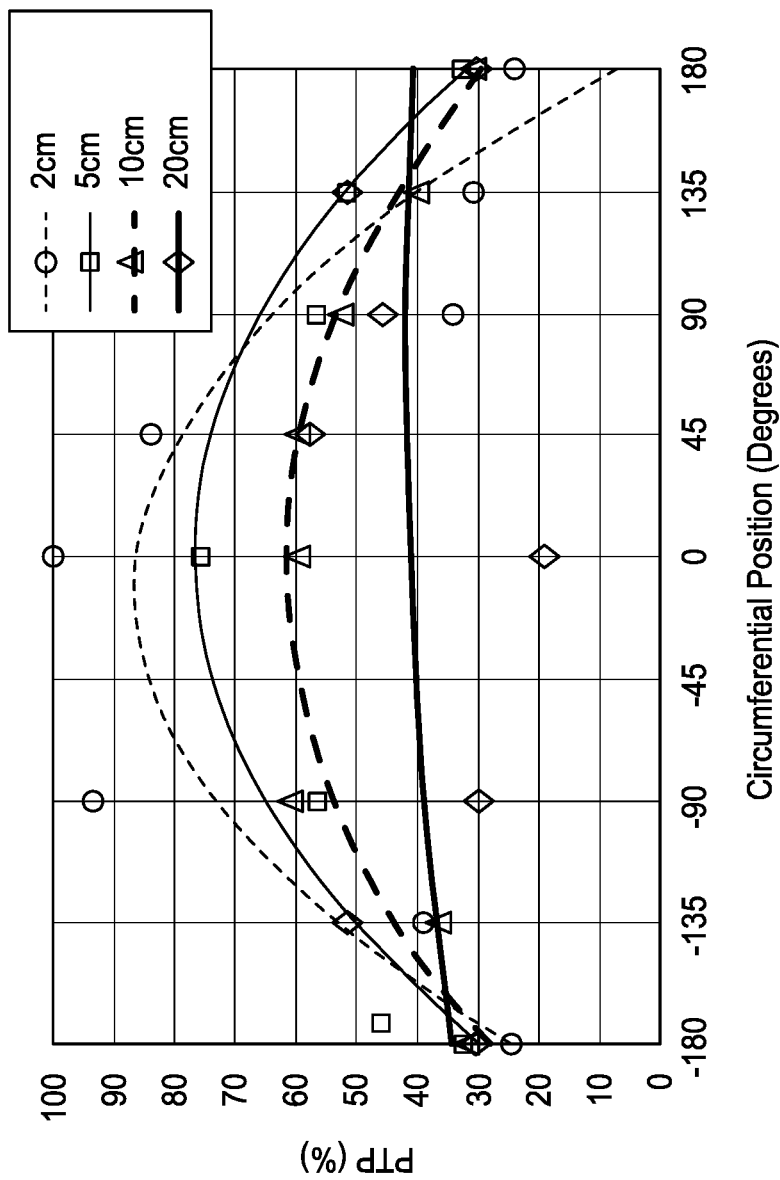
FIGS. 8A-8B depict sensor configurations along a portion of a heat exchanger assembly and data acquired using those sensor configurations according to an embodiment of the disclosure.
Figure 8A:
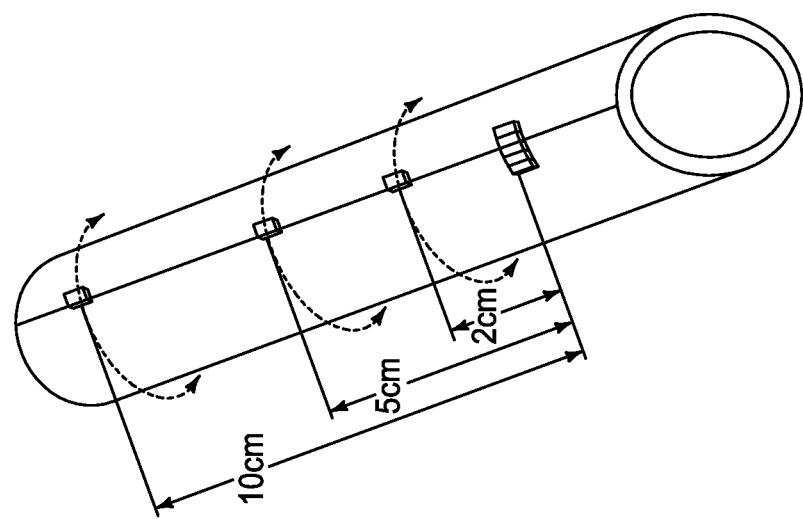

Referring next to FIGS. 8A and 8B, in order to investigate whether an array that covered only a small part of the interface would not be sensitive to flaws on the opposite side of the interface in a circumferential configuration such as a tube, arrays can be configured as shown in FIG. 8A and then plotted from a movable transducer rotated all the way around the tube, and data was taken at 2 cm, 5 cm, 10 cm, and 20 cm as shown in FIG. 8B. Referring to FIG. 8B, circumferential peak-to-peak (PTP) responses relative to max response @ 2 cm from 90-degree sensor at 2, 5, 10, and 20 cm axially from the transmitting sensor are demonstrated. The wave signal strength as shown is essentially uniform all the way around the circumferential configuration beyond 20 cm, which confirms that it is relatively unimportant to have a full circumference or two-sided transmitter, except perhaps to strengthen the overall transmitted signal.

Signals are not shown but it is noted that tests were performed with the same 3×4 sensor demonstrating that the SH-0 sensor signals were substantially unaffected by the presence or absence of water inside and outside the tube, and by the presence or absence of a simulated housing adhered to the tube.

Figure 9A:
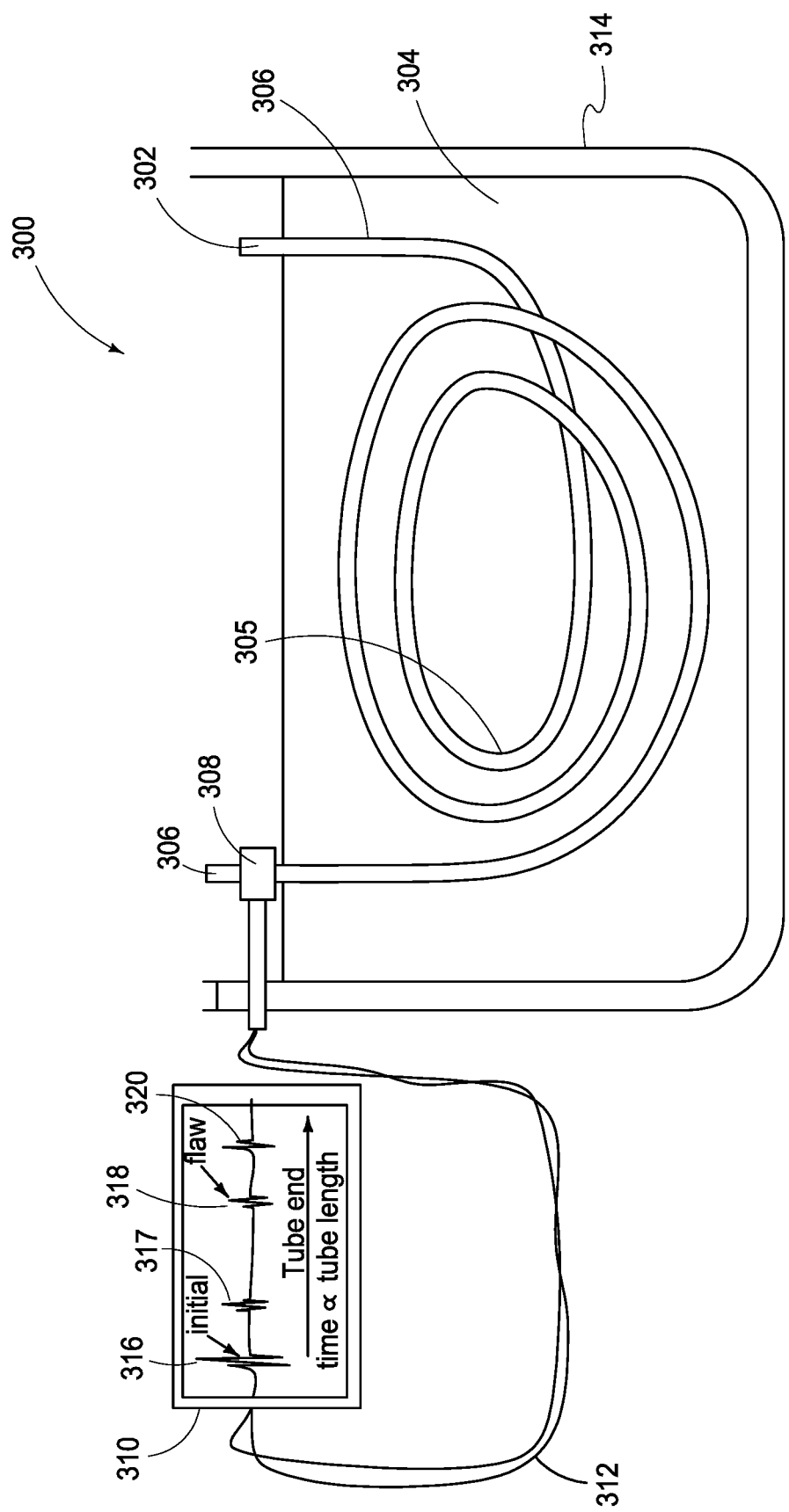
FIGS. 9A-9B depict a heat exchanger assembly configured for use in a fission reactor according to an embodiment of the disclosure.
Figure 9B:
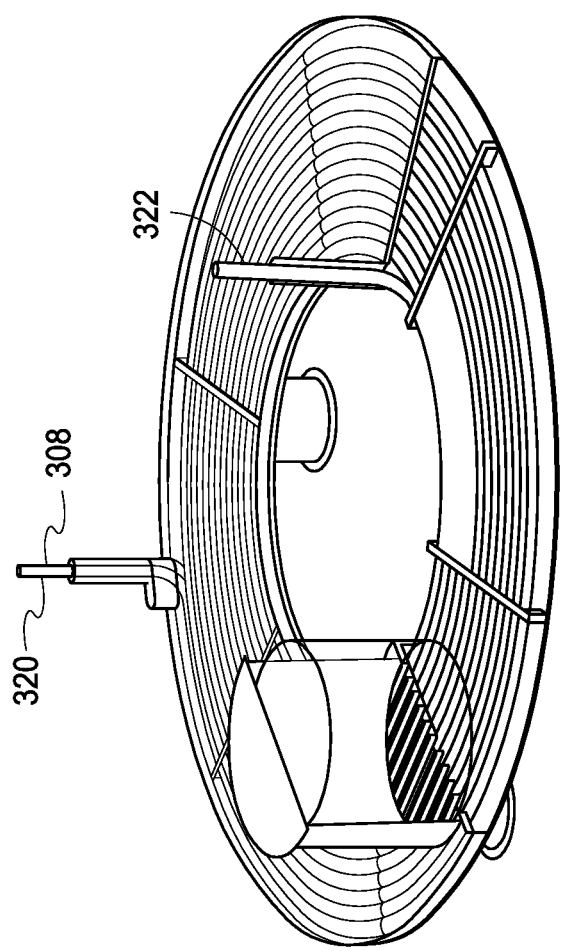

Referring next to FIGS. 9A and 9B, an example configuration of a heat exchanger assembly 300 is shown having secondary heat transfer fluid 302 within a conduit providing a thermal transfer interface 306 about a lead pool primary heat transfer fluid 304. In accordance with example implementations in this configuration, the primary lead pool fluid at 350-420° C., for example and the secondary tube ID water/steam fluid is at 320-400° C. System 300 can have housing and exit wire conduit 312 and through housing operably connected to thermal interface 306 can be detector assembly 308. In accordance with example implementations, an SH-0 wave can be traveling within thermal interface 306, and thermal interface 306 may have a crack or pit at 305. Accordingly, via sensor 308 and wires 312, processing circuitry 310 can record an initial signal 316, a near tube end signal 317, a flaw signal 318, and a far tube end signal 320.

In the field of Molten Salt Reactors (MSR), a variety of needs exist to sense and monitor conditions in harsh environments, and this plays a role in developing particular designs. All MSR designs have one or more heat exchangers. The broad experience with light water reactors (LWR) shows heat exchangers are among the most damage sensitive reactor system components, largely because the structural wall thickness that contain and isolate fluids are quite thin (1-2 mm). This short structural path is susceptible to corrosion and if corrosion occurs, it can quickly lead to a breach that will allow leakage and cross-contamination of primary or secondary fluid that will require shut-down and potentially very costly repair. The more limited experience with advanced reactors indicates the heat exchangers will be among the most at risk reactor system components for similar reasons.

These heat exchanger assemblies and methods can be utilized with various technologies, but for the most part, they can be particularly useful in the fission reactor technologies, particularly in molten or liquid metal heat transfer fluid technologies associated with fission reactors. These reactors are projected to provide extraordinarily inexpensive power per kilowatt hour, and can be relatively inexpensive to construct.

The principal advantages for molten salt and liquid metal reactors include that they are high temperature (vs. other fluid systems) and can configure as breeders/waste burners. They have low-pressure operation, stability of liquid under radiation, and high solubility of uranium and thorium (in fluoride salts, for example). The materials for these heat exchangers can be stainless steel, or Inconel, for example. Various layouts of these reactors can include the SFR (Super Phenix [France]), BN-600/800 [Russia], FFTR [US], Monju [Japan], EFR [China], PRISM [US], and TWR [US]. They can be used in the Hydromine lead reactors having a single-stage spiral heat-x, for example; the KAIROS power TRISO fuel-loaded molten salt reactor, for example; the FLIBE dissolved fuel molten salt reactor with hot gas heat-x and turbine, for example. These reactors can be operated at various conditions as shown in Table 1.

TABLE 1

Reactor Operating Parameter Comparison

|  | MSBR-Single Fluid | MSFR | AP1000 | S-PRISM | IMSR |
| --- | --- | --- | --- | --- | --- |
| Inlet temperature (° C.) | 566 | 675 | 280 | 363 | 625-660 |
| Outlet temperature (° C.) | 705 | 775 | 322 | 510 | 670-700 |
| Primary coolant flowrate (kg/s) | 11,820 | 18,920 | 14,300 | 2,992 | 5,400 |
| Thermal power (MW) | 2,250 | 3,000 | 3,400 | 1,000 | 400 |
| Core power density (MW/m$^3$) | 22.2 | 330 | 110 | 120 | 9-14 |
| Reactor pressure (MPa) | ~0.1 (cover gas) | ~0.1 (cover gas) | 15.5 (pressurizer) | ~0.1 (cover gas) | ~0.1 (cover gas) |
| Core structure volume (%) | 63-87 | 0 | ~50 | ~63 | 70-95 |

Figure 10:
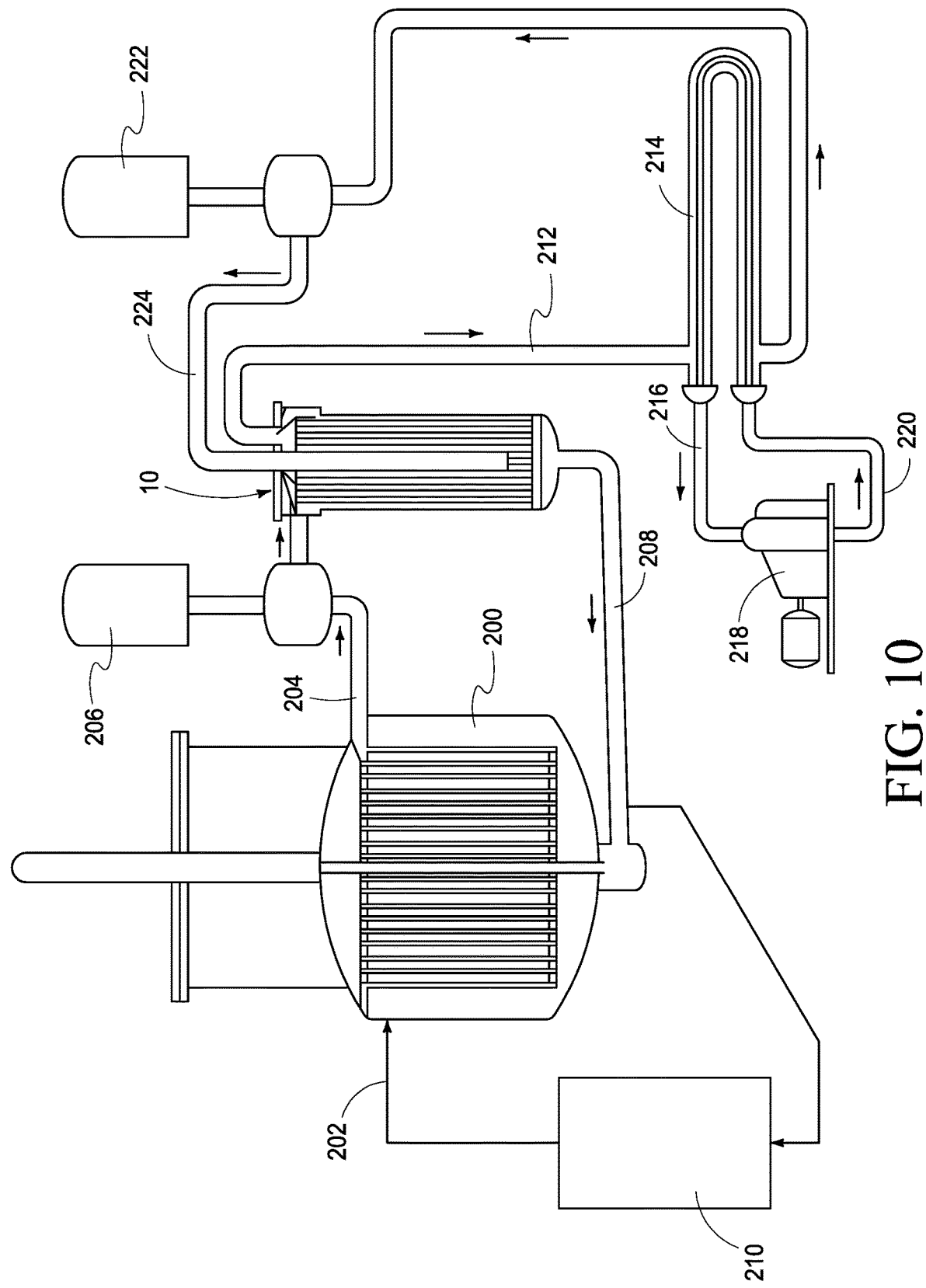
FIG. 10 is a depiction of an example fission reactor utilizing heat exchanger assemblies and methods of the present disclosure.

Next, and with reference to FIG. 10, at least one example implementation of the heat exchangers provided in this disclosure is shown in the context of a fission reactor. The reactor can have highly radioactive heat transfer fluids. These heat transfer fluids can be molten salt fluids, lead or sodium liquid metal fluids, or water/steam but typically the reactor designs themselves require that the heat transfer fluid remain in place when operating and ideally during shut-downs, therefore making it difficult, or impossible, or very cost intensive, to completely drain the entire system, the heat exchanger assembly, and then visually or with eddy current inspect the heat exchanger by sending a probe through each of the heat exchanger thermal interface tubes. Therefore, the present disclosure provides a great advantage over the prior art, in that in situ monitoring of the integrity of the thermal interface of the heat exchangers can be accomplished. In accordance with one example fission reactor 200 including graphite moderators can include a fuel salt that may include materials such as uranium materials. Example materials can be LiF, BeF$_2$, ThF$_4$, UF$_4$, and this primary coolant material can become heated during the fission process to a T1 at 204 and then pumped using a primary salt pump and motor assembly 206 to a heat exchanger assembly 10. Within this heat exchanger assembly, a coolant salt 224 can be provided, and the fuel salt can exit the heat exchanger at T2 which is substantially less than T1 at 208, for example. In accordance with example implementations, the T1 reactor exit and heat exchanger entrance piping or leg can be referred to as the hot leg of the heat exchanger. The T2 heat exchanger primary fluid exit is pumped to the reactor entrance and is referred to as the heat exchanger primary fluid exit or cold leg.

Referring next to another portion of this assembly and as shown in FIG. 10, a coolant salt 224 can be utilized to transfer thermal energy from the fuel salt. This coolant salt can exit the heat exchanger at a T3, and then provide thermal energy to steam generator 214. After leaving steam generator 214, coolant salt can be at a T4, which is substantially less than the T3 temperature exiting heat exchanger 10. This coolant salt can be provided via secondary salt pump 222 to return to heat exchanger 10 as a cold leg of heat exchanger 10. In accordance with example implementations and with reference to steam generator 214, the feedwater upon being exposed to the molten salt heat through the heat transfer interface to coolant salt 212 can have a T5 temperature, and that T5 temperature can elevate the water temperature to produce steam and allow for the operation of a turbo-generator 218. Upon leaving turbo-generator 218, temperature can be T6 at 220, and return (perhaps through a condenser) as recycled feedwater for more steam generation at steam generator 214.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A heat exchanger assembly including molten salt, liquid metal, or water/steam as part of the heat exchange fluids of the heat exchanger assembly, the assembly comprising:
    at least one thermal interface configured as a wall of a conduit between primary and secondary heat exchange fluids of the heat exchanger assembly;
    a sensor operably engaged with the at least one thermal interface; and
    a fission reactor operably coupled to the heat exchanger assembly.

2. The heat exchanger assembly of claim 1 wherein the sensor is integrated into the wall of the secondary conduit.

3. The heat exchanger assembly of claim 1 wherein the sensor is engaged with a secondary fluid exposed surface of the wall of the secondary conduit.

4. The heat exchanger assembly of claim 1 further comprising a sensor housing defining a space about the sensor.

5. The heat exchanger assembly of claim 4 further comprising a sensor conduit extending through the wall of the primary conduit to the space within the sensor housing.

6. The heat exchanger assembly of claim 4 wherein the processing circuitry is operably coupled to the sensor via one or more wires extending to the sensor within the sensor housing.

7. The heat exchanger assembly of claim 1 wherein one or both of the primary and/or secondary heat exchange fluids is one or both of lead, sodium or other low-melt metal.

8. The heat exchanger assembly of claim 1 wherein one or both of the primary and/or secondary heat exchange fluids is a molten salt.

9. The heat exchanger assembly of claim 1 wherein one or both of the primary and/or secondary heat exchange fluids is water or steam.

10. The heat exchanger assembly of claim 1 wherein the fission reactor utilizes a fuel molten salt.

11. The heat exchanger assembly of claim 10 wherein the heat exchanger assembly utilizes a coolant molten salt.

* * * * *